Nov. 23, 1965    J. L. BOWER ETAL    3,218,911
PHOTOELECTRIC GAUGE EMPLOYING A PLURALITY OF GRATINGS
Filed July 5, 1955    6 Sheets-Sheet 1

INVENTORS.
JOHN L. BOWER
WILTON R. ABBOTT
BY
ATTORNEY

Nov. 23, 1965    J. L. BOWER ETAL    3,218,911
PHOTOELECTRIC GAUGE EMPLOYING A PLURALITY OF GRATINGS
Filed July 5, 1955    6 Sheets-Sheet 2

INVENTORS.
JOHN L. BOWER
WILTON R. ABBOTT
BY
ATTORNEY

Nov. 23, 1965   J. L. BOWER ETAL   3,218,911
PHOTOELECTRIC GAUGE EMPLOYING A PLURALITY OF GRATINGS
Filed July 5, 1955   6 Sheets-Sheet 3

*INVENTORS.*
JOHN L. BOWER
WILTON R. ABBOTT
BY
*William R. Lane*
ATTORNEY

INVENTORS.
JOHN L. BOWER
WILTON R. ABBOTT

ATTORNEY

United States Patent Office 3,218,911
Patented Nov. 23, 1965

3,218,911
PHOTOELECTRIC GAUGE EMPLOYING A
PLURALITY OF GRATINGS
John L. Bower, Downey, and Wilton R. Abbott, Whittier, Calif., assignors to North American Aviation, Inc.
Filed July 5, 1955, Ser. No. 520,086
12 Claims. (Cl. 88—14)

This invention relates to a photoelectric gauge which provides precise measurement and indication of distances.

This photoelectric gauge makes maximum use of the information provided by photosensitive devices so as to indicate direction of displacement as well as magnitude.

Scientific apparatus often requires measurement of distances to an accuracy of one ten-thousandth of an inch. The control of automatic machine tools likewise requires reliable information as to distances to the same order of magnitude. It is proposed in the device of the invention that digital information provided by photosensitive cells which receive light from precisely located lines be utilized rather than the analog systems which require accurate voltage sources and precision electronic equipment. Information handled in digital form is advantageous in that each bit of indicated information is discrete in character and reliably distinguishable from other bits of information.

Various schemes of measurement in the past have provided only for indication of the accuracy of specific lengths or have provided single heads and have obtained a minimum of information from the gauge.

This invention proposes taking advantage of the statistical average accuracy of many lines scribed by a device such as the ruling engine or many lines photographically reproduced from scribed standards.

It further proposes using several heads to obtain indications of distances which is a fraction of the distance between scribed lines. This invention maintains simplicity despite the precision which it obtains.

It is, therefore, an object of this invention to provide a photoelectric gauge.

It is the further object of this invention to provide a photoelectric gauge which indicates direction and magnitude of displacement.

It is still another object of this invention to provide a photoelectric gauge having improved accuracy.

It is still another object of this invention to provide a photoelectric gauge which cumulatively indicates distances traveled in either direction.

It is still another object of this invention to provide a photoelectric gauge utilizing information in digital form.

It is still another object of this invention to provide a precision photoelectric gauge of relatively economical construction.

It is still another object of this invention to provide a photoelectric gauge which is relatively insensitive to variations in power supply and characteristics of circuit elements.

It is still another object of this invention to provide a photoelectric gauge which is relatively insensitive to relative displacement between the gauge beam and the gauge head except in the sensitive direction.

Other objects of invention will become apparent from the following description taken in connection with the accompanying drawings, in which.

Figure 1:
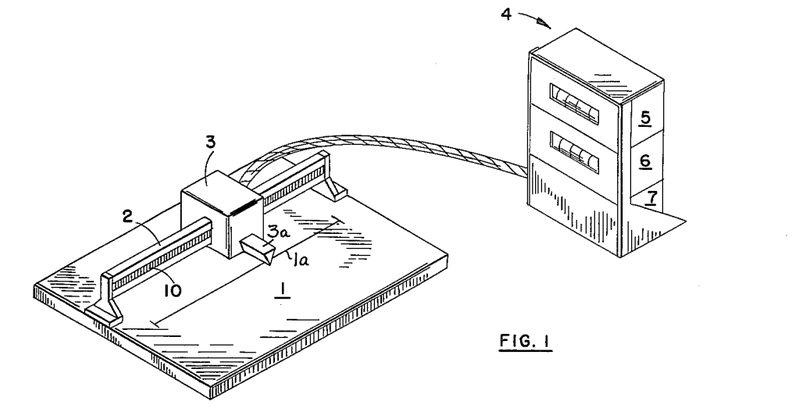
FIG. 1 is a perspective of the photoelectric gauge and an associated console.

Referring to FIG. 1, a worktable 1 has located thereon a gauge beam 2 which is traversed by a gauge head assembly 3, which provides electrical indications of distance and direction traveled by triangular projection 3a along line 1a. The electrical signals so provided are sent to a console 4 comprised of a right counter 5 and a left counter 6 and various electronic equipment 7 such as the power supply, amplifiers, and logical circuitry hereinafter described.

Figure 2:
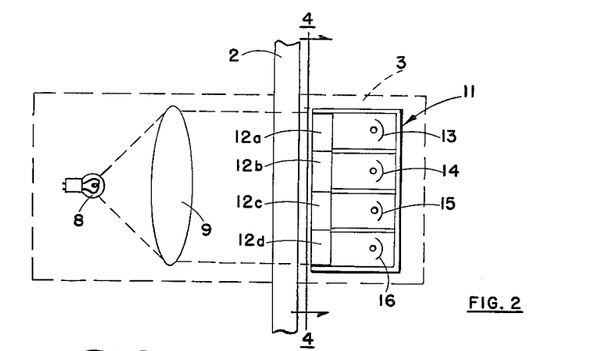
FIG. 2 is a schematic diagram of the photoelectric gauge beam and the gauge head assembly.

FIG. 2 is a schematic drawing of head assembly 3, showing its cooperation with gauge beam 2. A light source 8 is collimated by lens 9 to provide light in parallel rays to gauge beam 2, which, in this embodiment, is transmissive.

Referring to FIG. 1 a primary transmission grating 10 extends the length of gauge beam 2. This grating may consist of ruled or etched lines scribed, for example, by a ruling engine upon the gauge beam which is an optical element, that is, having light reflective or transmissive characteristics. It may be made of material such as glass or fused quartz. The scribed lines make the glass or quartz reflective and somewhat opaque. These scribed lines or "lines of opaque areas" as they are termed in the claims, prevent light from passing through the optical element. Light rays can still pass between adjacent lines. It is to be understood that "lines of opaque area" can be generated as, for example, by an optical element which is non-transmissive, and becomes light transmissive wherever lines are scribed. The "lines of opaque areas" then occur between the scribed lines. Other gratings are made by photographic reproduction and may be reproduced to an accuracy of 500 lines per inch or greater. Another method of producing a gauge beam is to use a beam of plate glass which is smoked over a flame and one edge moistened with alcohol. The alcohol spreads over the film and on drying leaves it compact enough to enable ruled lines to be made on it with a sharp steel point using a dividing engine. A thin glass plate may then be used to cover the grating to prevent subsequent damage. In other embodiments, gauge beam 2 may be made of a plastic. A final method may be used in which an opaque material is painted on a scribed bar and then wiped off leaving the opaque material in the grooves. Utilizing numerous scribed lines, as for example those of a grating, provides an average accuracy greatly exceeding the accuracy of any single line.

FIG. 2 is a schematic diagram of the head assembly 3, shown in FIG. 1. Light is received from source 8 at collimating lens 9 which directs parallel ray of light through beam 2, to reading head 11 which consists of ruled secondary gratings 12a, 12b, 12c and 12d similar to that of gauge beam 2 and photosensitive devices 13, 14, 15 and 16.

Figure 3:
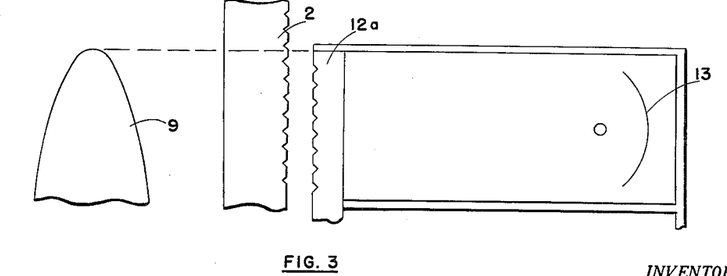
FIG. 3 is an enlarged schematic of a portion of FIG. 2.

FIG. 3 is an enlarged diagram of lens 9, gauge beam 2 and photoelectric cell 13 to which light is either transmitted or is not transmitted by reason of the relative location of the scribed lines on gauge beam 2 and scribed lines on grating 12.

Figure 4:
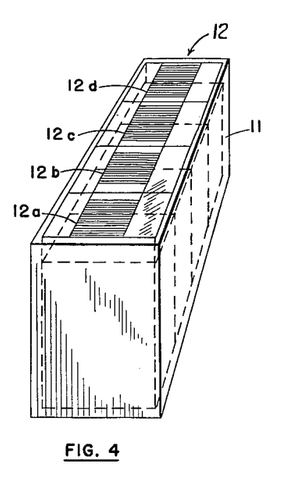
FIG. 4 is a perspective, looking in general from line 4—4, FIG. 2.

FIG. 4 is an illustration of reading head 11, showing more clearly each section of grating 12 which is constructed in the same manner essentially as grating 10 of gauge beam 2. Light cannot pass through grating 12 except between the scribed lines.

Figure 5:
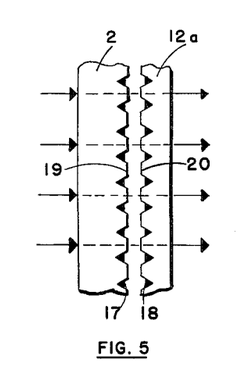
FIG. 5 is an enlarged illustration of the lines scribed on the gauge beam and reading head showing light rays passing therethrough.

FIG. 5 is a further illustration of light passing through gauge beam 2 and continuing through ruled grating 12 in which the ruled lines, such as 17 and 18, are located oppositely from each other as are lands 19 and 20. Light is transmitted through beam 2 and grating 12 by reason of the matching of the lands.

Figure 6:
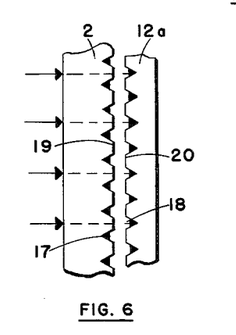
FIG. 6 is an enlarged illustration of the lines scribed on the gauge beam and reading head showing light rays being prevented from passing therethrough.

FIG. 6 shows a prevention of light being transmitted by reason of the fact that lands such as 19 are now opposite ruled lines such as 18 which prevents light from passing through grating 12. With 500 lines per inch ruled on gratings 2, 12a, 12b, etc., it is necessary that grating 2 be placed in close, proximate relationship with gratings such as 12a, 12b, etc. For example, the distance between grating 2 and the other gratings is held to .0002 to .0003 of an inch. Diffraction will then not occur to interfere with the proper operation of the gratings. They will pass light when aligned and prevent light from passing when not aligned. The distance grating 2 is to be placed from the other gratings, in order to prevent undesirable effects from diffraction, depends, of course, upon the number of lines per inch inscribed upon the gratings.

It will be noted, then, that the photosensitive devices either receive or do not receive light, which information is digital and binary in character. If five hundred lines per inch are ruled, each photosensitive device will receive and then not receive light cyclically, five hundred times every inch of relative displacement between grating 12 and gauge beam 2 in the measuring direction, that is, the sensitive direction.

Figure 7:
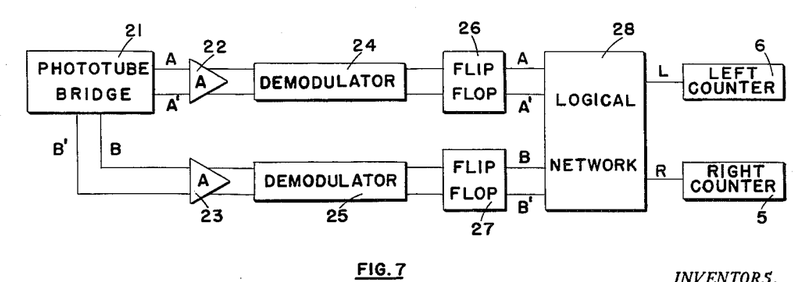
FIG. 7 is a block diagram of the device utilizing information provided by the photoelectric head assembly.

FIG. 7 illustrates the use of the digital information provided by the photosensitive devices. It consists of a bridge 21 which receives signals from the four photosensitive devices and furnishes these signals to amplifiers 22 and 23, and then to phase-sensitive demodulators 24 and 25 which receive their reference frequency from oscillator 31 in the phototube bridge 21 (see FIG. 8). Flip-flops 26 and 27 receive the signals and provide an output signal to logical network 28, hereinafter described, which provides to one counter 5 all the motion in the right direction, for example, and to counter 6 all the motion in the left direction, for example, which is determined by the logic of network 28.

Figure 8:
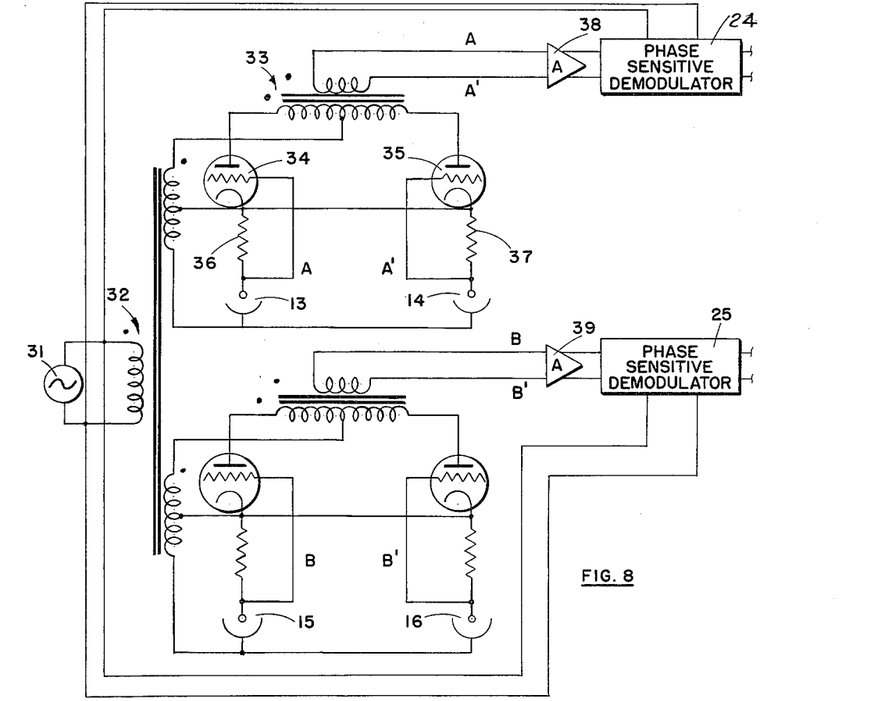
FIG. 8 is an electrical schematic diagram of the phototube bridge.

FIG. 8 is an illustration of a possible bridge connection of the four photosensitive devices 13, 14, 15 and 16. Excitation is obtained from oscillator 31 through transformer 32, to the center tap of transformer 33, which alternately provides plate supply voltage to triodes 34 and 35. The grid voltage of tubes 34 and 35 is controlled by the conduction of photosensitive devices 13 and 14, these voltages being developed across resistors 36 and 37. The output to amplifier 38 is a signal of one polarity (indicated by A) or signal of the opposite polarity (indicated by A') depending upon which photosensitive device, 13 or 14, is receiving light and is conducting. In a like manner, amplifier 39 is receiving signals B or B' (of one polarity or another) depending upon which photosensitive device, 15 or 16, is receiving light and conducting.

Figure 9:
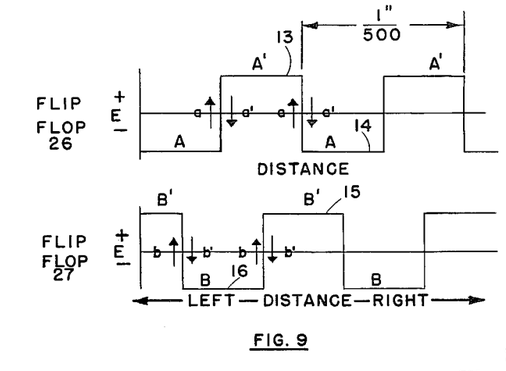
FIG. 9 is a graphical representation of the output provided by the flip-flops of FIG. 7.

Referring now to FIG. 9, the construction of the logical network 28 will be developed. This logical network, which is also commonly referred to in the art as a switching network, or logical digital network, contemplates a digital device to which input signals may be applied and from which output signals are obtained that are the herein prescribed function of the input signals. Referring momentarily to FIG. 2, it is desirable that photosensitive device 14 receive no light while photosensitive device 13 is receiving light, that is, secondary grating 12b is located an odd number, "N," of half wave lengths or spacings from secondary grating 12a. Wherein a wave length, "λ," is defined as the distance of the spacing from one scribed line to the next. This wavelength or spacing is the distance from one side of an opaque line to the corresponding side of the next opaque line. Further, gratings 12c and 12d are likewise located an odd number, "N," of half wave lengths or spacings apart from each other. Grating 12c is located an odd number, "N," of quarter wave lengths or spacings from grating 12b. The ultimate effect of these locations is that heads 15 and 16 receive equal amounts of light when heads 13 and 14 receive unequal amounts and vice versa.

Having located the heads physically, a graph may be drawn illustrating the state of flip-flops controlled by the information provided by each photosensitive device, as in FIG. 9. It can be seen that the ordinate is voltage, "E," and the abscissa is relative motion of the heads relative to the gauge beam. When photosensitive device 13 is conducting, the information A' is provided by one state of flip-flop 26. When photosensitive device 14 is conducting, the information A from flip-flop 26 is provided, as is corroborated by the previous explanation of relative physical location of these devices, FIG. 2, and by their being connected to opposite ends of transformer 33 of FIG. 8. Removed 90 degrees, or $N/4$ λ, from the square wave produced by flip-flop 26 is the square wave produced by flip-flop 27. Proposition B' is indicated by flip-flop 27 being in a state set by the conduction of photosensitive device 15 and proposition B is indicated by the flip-flop 27 being in the other state set by conduction of photosensitive device 16. It will be noted that a complete square wave is generated each one five-hundredths of an inch of motion between gauge head and gauge rod. From these two square waves is written a logical equation which utilizes the information provided by each state of the flip-flops and each change of state of the flip-flops to indicate the direction the head is traveling with respect to the gauge rod and a pulse for every one two-thousandths of an inch traveled. Further notations are made indicating "$a'$" as being a change from "A'" to "A," and "$a$" being a change from "A" to "A'"; also, "$b'$" is a change from "B'" to "B," and "$b$" is a change from "B" to "B'." A logical equation can now be written from inspection of FIG. 9 indicating the right or left motion of the gauge head and gauge beam with respect to each other. The equation is written as follows:

(1) $\quad R = aB + bA' + a'B' + b'A$
(2) $\quad L = aB' + a'B + b'A' + bA$

The notation "R" stands for a motion in the right direction, and "L" stands for a motion in the left direction of one two-thousandths of an inch which is indicated by a pulse. The notation, such as $aB$, indicates the proposition that both must occur, that is, it is a coincidence notation. The notation "+" indicates the relation "or"; that is, in the equation Number 1 above a pulse indicating "R" motion occurs if $a$ and B occur, or $b$ and A' occur, or $a'$ and B' occur, or $b'$ and A occur. A' and A are complements and each occurs when the other does not. The same is true of B and B'. A referral to FIG. 9 corroborates the foregoing.

From Equations 1 and 2 above, it will be noted that both "and" and "or" logical gates must be used and, in addition, referring to FIG. 9, it will be noted that the propositions $a$, $a'$, $b$ and $b'$ are changes, or derivatives. Therefore, some form of derivative circuit must be utilized in the logical network 28.

Figure 10:
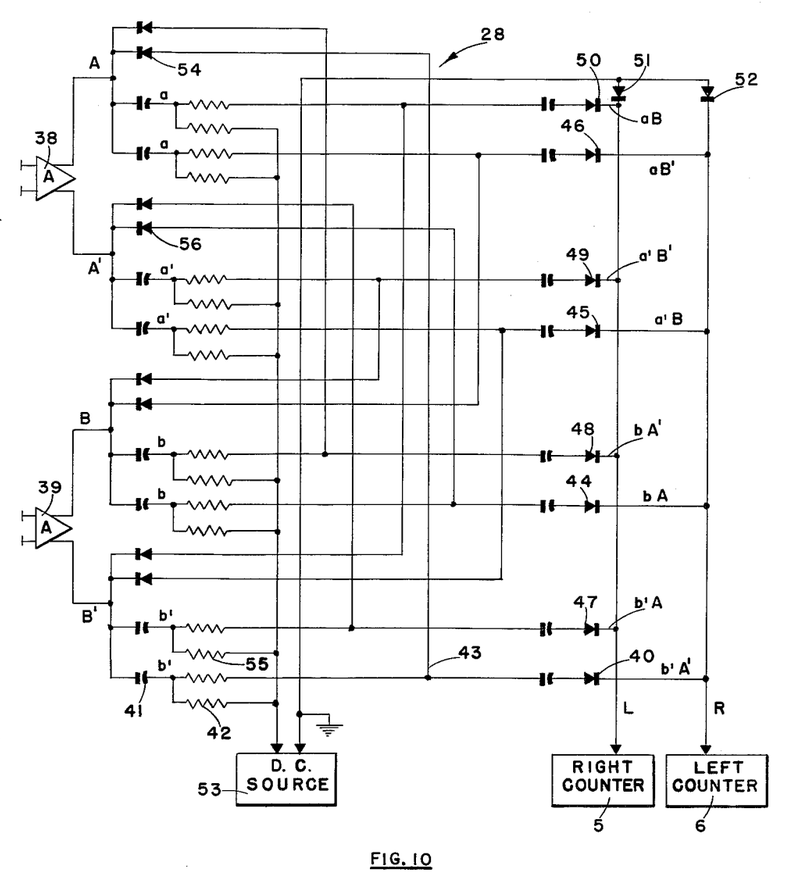
FIG. 10 is a schematical diagram of the logical network 28 of FIG. 7.

FIG. 10 is an electrical schematic of the logical network 28 receiving at its input propositions A, A', B and B', and providing at its two outputs R to the right counter 5 and L to the left counter 6. Referring momentarily to Equations 1 and 2, it can be seen that a pulse is received at left counter 6, through diode 40, according to the output of a derivative circuit consisting of capacitor 41 and resistor 42, providing flip-flop 38 is in the state A′. Assume −3 volts on one output line of flip-flop 38 represents the existence of the proposition or the true state and 0 volts on the other line represents the nonexistence or false state. It can be seen that if flip-flop 38 is in state A, diode 54 will be biased to allow conduction and the pulse b′ from capacitor 41 will pass through line 43 and not pass through diode 40. However, if flip-flop 38 is in state A′, diode 54 is nonconducting and the pulse through capacitor 41 passes through diode 40 and reaches left counter 6. Other diodes 44, 45 and 46 provide similar pulses to left counter 6. Right counter 5 receives similar pulses through diodes 47, 48, 49 and 50.

Low voltage D.-C. source 53 holds the lines connected to the resistors such as 42 and 55 below ground. Thus, output pulses are possible only on lines whose control diodes, such as 54 and 56, have cathodes at ground potential (that is, 0 volts).

Diodes 51 and 52 allow only positive pulses to reach the counters.

Figure 11:
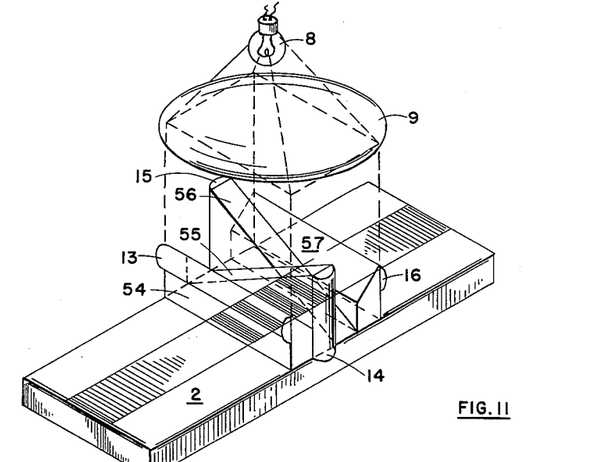
FIG. 11 is a perspective diagram of a reflective grating beam.

FIG. 11 illustrates the use of a reflective grating as distinguished from the transmission gratings. Gauge beam 2 of speculum has scribed lines thereon, and the lands between lines return light received perpendicularly while the scribed lines do not. A group of four prisms 54, 55, 56 and 57 are located adjacent to each other and have transmission gratings ruled on their faces. Light is transmitted from source 8, through collimating lens 9 through the prisms and is or is not reflected by each prism depending on the alignment of the grating of each respective prism with respect to the grating of the gauge beam. The four ruled gratings of the heads are specific N/2 and N/4 wave lengths or spacings apart as explained previously. The photosensitive devices 13, 14, 15 and 16 are located to receive the light reflected by the prism surfaces.

Figure 12:
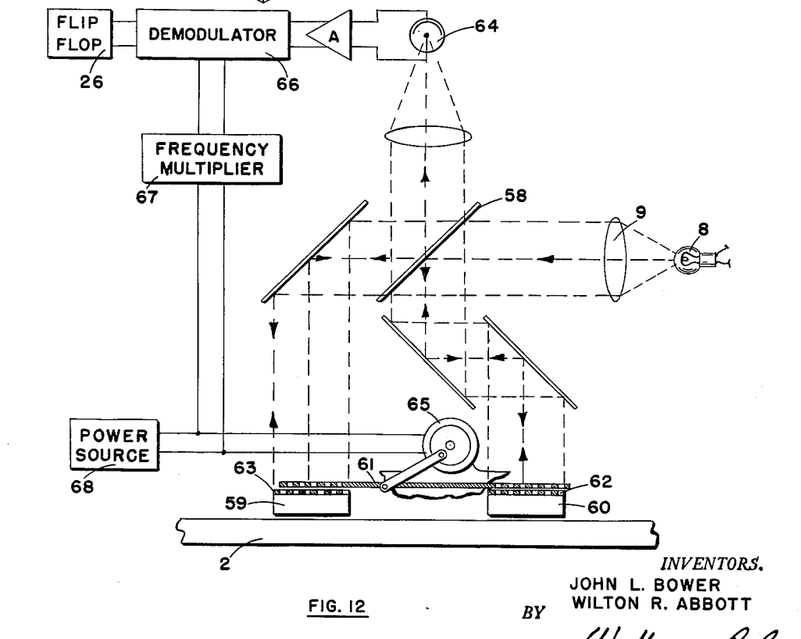
FIG. 12 is a diagram of a time-shared photocell system.

If desired, an optical system such as shown in FIG. 12 may be utilized in which a single photocell is time-shared to read two gratings. Light from source 8 is collimated by lens 9 and passed to beam splitter 58 where it is divided to pass through gratings 59 and 60. According to the location of shutter 61 and its two grids 62 and 63, light is first allowed to pass to one grating and then allowed to pass to the other. Photocell 64 then receives light which is chopped by the rotation of motor 65 which drives shutter 61. The chopped output of photocell 64 is sent to demodulator 66 which demodulates according to a reference frequency received from a frequency multiplier 67 driven by the common source of power 68. A D.-C. output is received from demodulator 66 to control the state of flip-flop 26.

Figure 13:
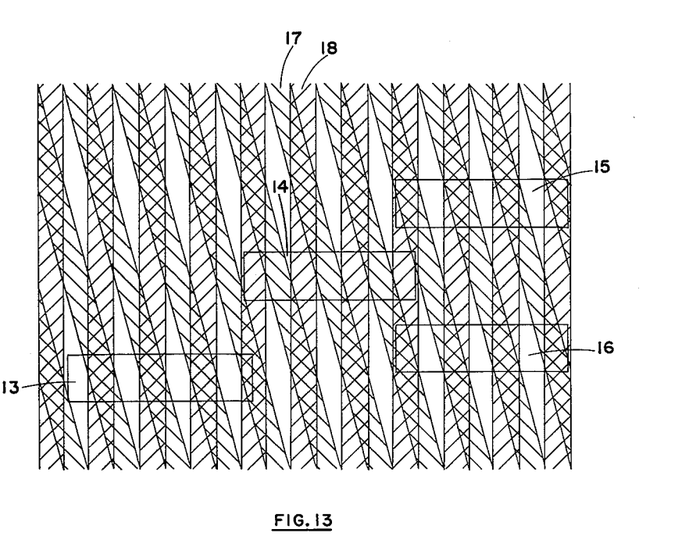
FIG. 13 is a method utilizing a single grating for the reading heads.

In FIG. 13 a single grating reading head is used. Ruled lines such as 18 of gauge beam 2 are at angle with the lines such as 17 of a single reading grating 12. The four photosensitive devices 13, 14, 15 and 16 are located to receive light from the areas shown which provides relative outputs as previously described. Device 13 is receiving a maximum amount of light while device 14 receives a minimum and devices 15 and 16 are receiving equal amounts. It will be understood that, according to the concept of the invention, each photocell extends for a great many more lines than is indicated. It may be understood that each photoctll should receive enough light to provide an unambiquous electrical output. It has been found in situations where lines are scribed 500 to the inch (each line being 1,000 of an inch wide), that the photocell requires light from a width of 10 to 20 lines. Therefore, referring to FIG. 2, the number of lines scribed on a secondary grating such as 12a, should be 10 to 20 to provide sufficient light. It has been further found that in a ruling engine that there is a short period error which reoccurs cyclically every quarter of an inch. It is desirable in gauges generated by such ruling engine that each secondary grating such as 12a, FIG. 2, should extend for a length greater than the cyclical error, in which case, the secondary grating would have a hundred or more lines. The statistical averaging obtained by the number of lines depends on various cyclical and random factors and therefore it is difficult to adjudge the number of lines that will remove the greatest amount of error. It is felt that statistical averaging is readily obtained with secondary gratings having 50 lines or more.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A measuring device comprising a primary optical element having several hundred parallel, uniformly-spaced, opaque lines to the inch thereon, four secondary optical elements having the same number of opaque lines to the inch thereon, said secondary optical elements disposed in proximate relationship with said primary optical element and said secondary optical elements disposed so as to generally transmit different amounts of light with respect to each other, said secondary optical elements adapted to move as a unit with respect to said primary optical element so as to bring the opaque lines of said secondary optical elements into and out of register with the opaque lines of said primary element, light source means disposed to provide light through primary and said secondary elements, four photosensitive devices each disposed in an output light path of a respective secondary optical element and said primary optical element, said secondary optical elements spaced apart and said photosensitive devices spaced apart so that two of said photosensitive devices receive equal amounts of light as the other two receive unequal amounts.

2. A measuring device comprising a primary optical element having several hundred opaque, parallel, uniformly-spaced lines to the inch thereon, a group of secondary elements including a second, third, fourth and fifth optical element having the same number of opaque lines thereon, said second, third, fourth and fifth optical elements disposed in proximate relationship with said primary optical element, said second, third, fourth and fifth optical elements adapted to move as a unit in a longitudinal direction with respect to said primary optical element, light source means disposed to provide light through said primary and secondary optical elements, four photosensitive devices, each disposed in a respective output light path from said second, third, fourth and fifth optical elements and said primary optical element, said third optical element located with respect to said second optical element so as to provide maximum amount of light to its respective photosensitive device when said second optical element provides a minimum amount of light to its respective photosensitive device, and said fifth optical element located with respect to said fourth optical element to provide a maximum amount of light to its respective photosensitive device when said fourth optical element provides a minimum amount of light to its respective photosensitive device, and wherein said fourth and fifth optical elements are located to provide substantially equal amounts of light to their respective photosensitive devices when said second and third optical elements provide unequal amounts of light to their respective photosensitive devices.

3. A measuring device comprising a primary optical element having numerous uniformly-spaced lines of opaque areas thereon, two pair of secondary optical elements having numerous similarly spaced lines of opaque areas thereon, said secondary elements disposed in proximate relationship with said primary element, one of said primary and secondary elements disposed to move along the other of said primary and secondary elements so as to bring the lines of said primary element into and out of registry with the lines of said secondary elements, light source means disposed to transmit light through one of said primary and secondary elements to the other of said primary and secondary elements, and four photosensitive devices each individual to and disposed in the output light path of a respective one of said secondary elements, one pair of secondary elements spaced apart so that the light received by the respective photosensitive device from one of said elements is 180° out of phase with the light received by the respective photosensitive device from the other of said elements, and wherein the other pair of secondary elements are spaced apart so that the light received by the respective photosensitive device from one of said elements is 180° out of phase with the light received by the respective photosensitive device from the other said element, and wherein the light received by respective photosensitive devices from one pair of secondary elements is a fraction of 180° out of phase with the light received by respective photosensitive devices from the other pair of secondary elements, logical network means responsive to the outputs of said photosensitive devices and the changes in outputs of said photosensitive devices to provide information of the relative positions of said primary and secondary optical elements and the direction of motion between said primary and secondary optical elements.

4. A measuring device comprising a primary optical element having uniformly-spaced lines of opaque areas thereon, a pair of secondary optical elements having similarly spaced lines of opaque areas thereon, said secondary optical elements disposed in proximate relationship with said primary optical element and extending for a distance of numerous lines of both said primary and secondary optical elements, said secondary elements disposed for unitary movement relative to said primary element so as to bring the lines of said primary and secondary elements into and out of registry, light source means disposed to transmit light through one of said primary and secondary elements to the other of said primary and secondary elements, two photosensitive devices each individual to and disposed in the output light path of a respective one of said secondary elements, said secondary elements spaced a predetermined distance apart so as to provide light from said source to said devices in 180° out-of-phase relationship, logical digital network means responsive to the relative outputs of said photosensitive devices and the changes in the outputs of said photosensitive devices to provide information of relative motion between said primary and secondary optical elements.

5. A measuring device comprising a primary optical element and a plurality of secondary optical elements having numerous, parallel, equally-spaced lines of opaque areas thereon, said plurality of secondary optical elements adapted to move as a unit relative to said primary element, each said secondary optical element disposed in proximate relationship with said primary optical element and extending for a distance of at least several lines of said primary optical element, a light source disposed to transmit light through said primary optical element to said secondary optical elements, a plurality of photosensitive devices each disposed in an output light path of a respective secondary optical element, said secondary optical elements being disposed so as to provide light from said source in an out-of-phase relationship to respective photosensitive devices, flip-flop means connected to receive and indicate the output of each said photosensitive devices, differentiating means providing a signal indicating the change in output of said flip-flop means, coincidence means connected to receive the output of said flip-flop means and said differentiating means whereby is provided an output indicating means indicating the relative motion between said primary and said secondary optical elements and the direction of motion between said primary and secondary elements.

6. A measuring device comprising a primary optical element and four secondary optical elements each having several hundred, parallel, equally-spaced lines of opaque areas to the inch thereon, said secondary optical elements adapted to move as a unit, relative to said primary optical element, each said secondary optical element disposed in proximate relationship with said primary optical element, a light source disposed to transmit light from one of said primary and secondary optical elements to the other of said primary and secondary optical elements, said secondary optical elements spaced apart so as to provide light from said source which is out of phase an odd number of quarters of the spacing between said lines, a plurality of photosensitive devices each disposed in an output light path of a respective secondary optical element, and a logical digital network connected to receive the output of said photosensitive devices, said logical digital network mechanized according to the following equations:

$$R = aB + bA' + a'B' + b'A$$
$$L = aB' + a'B + b'A' + bA$$

wherein the notation "R" indicates motion in the right direction, and "L" indicates motion in the left direction, wherein A represents a difference in output between a first and a second of said photosensitive devices indicating a predetermined magnitude of light received by said first over said second device, A' represents a difference in output in light between said first and second said photosensitive devices indicating a predetermined magnitude of light received by said second over said first device, B represents a difference in output between a third and fourth of said photosensitive devices indicating a predetermined magnitude of light received by said third over said fourth photosensitive device, and B' represents a difference in output between a third and a fourth of said photosensitive devices indicating a predetermined magnitude of light received by said fourth over said third photosensitive device, "a'" indicates a change from "A'" to "A," and "a" is a change from "A" to "A'," and "b'" is a change from "B'" to "B," and "b" is a change from "B" to "B'," and the notation such as aB, indicates the proposition that both must occur, that is, it is a coincidence notation, and the notation "+" indicates the relation "or," whereby a signal indicating right motion ("R") occurs if a and B occur, or b and A' occur, or a' and B' occur, or b' and A occur wherein the prime letters are complements of their corresponding unprimed letters.

7. A measuring device comprising a primary optical element and a plurality of secondary optical elements each having several hundred, parallel, equally-spaced lines of opaque areas to the inch theron, said secondary optical elements adapted to move as a unit, relative to said primary optical element, each said secondary optical element disposed in proximate relationship with said primary optical element and extending for a distance of numerous lines of said primary optical element, said secondary optical elements spaced apart an integral number of quarters of the spacing between said lines, a light source disposed to transmit light through said primary to said secondary optical elements, a plurality of photosensitive devices each disposed in an output light path of a respective secondary optical element, a plurality of flip-flops each connected to receive and indicate the output of a respective photosensitive device, differentiating means connected to receive the output of said flip-flops, coincidence means connected to receive the output of said flips-flops and said differentiating means and provide an indication of the relative motion between said primary and secondary optical elements and the direction of motion between said primary and secondary optical elements, said coincidence means being mechanized according to the following equations:

$$R = aB + bA' + a'B' + b'A$$
$$L = aB' + a'B + b'A' + bA$$

wherein the notation "R" indicates motion in the right direction, and "L" indicates motion in the left direction, wherein A represents one state of the first of said flip flops, A' represents the other state of said first flip flop, B represents one state of the second of said flip flops and B' represents the other state of the second of said flip flops, "$a'$" is a change from "A'" to "A," and "$a$" is a change from "A" to "A'," and "$b'$" is a change from "B'" to "B", and "$b$" is a change from "B" to "B'," and the notation such as $a$B, indicates the proposition that both must occur, that is, it is a coincidence notation and the notation "+" indicates the relation "or," whereby, a signal indicating right motion ("R") occurs if $a$ and B occur, or $b$ and A' occur, or $a'$ and B' occur, or $b'$ and A occur wherein the prime letters are complements of their corresponding unprimed letters.

8. A measuring device comprising a primary optical element having several hundred uniformly-spaced lines of opaque areas to the inch, a first and second pair of secondary optical elements having similarly spaced lines, said secondary optical elements adapted to move as a unit and in a manner so that the lines of said secondary optical elements are continuously parallel with the lines of said primary optical element, said secondary optical elements disposed in proximate relationship with said primary optical element, a light source disposed to provide light from one of said primary and plurality of secondary elements to the other of said primary and plurality of elements, a plurality of photosensitive devices, each disposed to receive the light output from a respective secondary optical element and said primary optical element, said secondary elements spaced apart and said photosensitive devices spaced apart so as to cause one of each pair of said photosensitive devices to have an output indicative of an intermediate amount of light while the output of the other device of said pair indicates one of a maximum and a minimum amount of light.

9. The combination recited in claim 8 wherein the output of one of said second pair of devices indicates an intermediate amount of light simultaneously with one of said first pair of photosensitive devices and the output of the other of the second pair of photosensitive devices simultaneously indicates the opposite amount of light from the remaining photosensitive device of said first pair.

10. A measuring device comprising a primary optical element having numerous opaque parallel, uniformly-spaced lines to the inch thereon, a group of secondary elements including a second, third, fourth, and fifth optical element having the same number of opaque lines thereon, said second, third, fourth, and fifth optical elements disposed in proximate relationship with said primary optical element, said second, third, fourth and fifth optical elements adapted to move as a unit in a longitudinal direction with respect to said primary optical element, light source means disposed to provide light through said primary and secondary optical elements, four photosensitive devices, each disposed in a respective output light path from said second, third, fourth, and fifth optical elements and said primary optical element, said third optical element located with respect to said second optical element so as to provide maximum amount of light to its respective photosensitive device when said second optical element provides a minimum amount of light to its respective photosensitive device, and said fifth optical element located with respect to said fourth optical element to provide a maximum amount of light to its respective photosensitive device when said fourth optical element provides a minimum amount of light to its respective photocell and wherein said fourth and fifth optical elements are located to provide substantially equal amounts of light to their respective photosensitive devices when said second and third optical elements provide unequal amounts of light to their respective photosensitive devices.

11. A measuring device comprising a first grating, a second grating disposed in proximate relationship with said first grating, light source means disposed to provide light through one of said first and second gratings to the other, photosensitive means disposed in the output light path of said first and second gratings, a third grating in proximate relationship with said first grating, said light source means disposed to provide light through one of said first and third gratings to the other, said second and third gratings being adapted for motion, as a unit, relative to said first grating, photosensitive means disposed in the output light path of said first and third gratings, said second and third gratings disposed so as to provide light in a 180° out-of-phase relationship with respect to each other along said first grating, said gratings having equally and uniformly-spaced lines thereon.

12. The combination recited in claim 11 wherein is further included fourth and fifth gratings in proximate relationship with said first grating, said light source means disposed to provide light through one of said first and said fourth gratings to the other, and through one of said first and said fifth gratings to the other, having equally and uniformly-spaced lines thereon, and photosensitive means disposed in the output light path thereof, said fourth and fifth gratings disposed so as to provide light in a 180° out-of-phase relationship with respect to each other along said first grating and wherein said fourth grating provides light in an approximately 90° out-of-phase relationship with respect to the light provided by one of said second and third gratings.

References Cited by the Examiner

UNITED STATES PATENTS

| 2,122,818 | 7/1938 | Ladrach. |
| 2,406,299 | 8/1946 | Koulicovitch. |
| 2,462,292 | 2/1949 | Snyder _______________ 88—14 |
| 2,479,802 | 8/1949 | Young _______________ 88—14 |
| 2,596,752 | 5/1952 | Williams _____________ 88—14 |
| 2,604,004 | 7/1952 | Root _________________ 88—14 |
| 2,656,106 | 10/1953 | Stabler _____________ 235—92 |
| 2,886,717 | 5/1959 | Williamson et al. ____ 88—14 |

FOREIGN PATENTS 476,720    9/1951    Canada.

JEWELL H. PEDERSEN, *Primary Examiner.*

EMIL G. ANDERSON, JOSEPH E. GONSALVES,
*Examiners.*